US010624459B1

(12) United States Patent
Lykouretzos

(10) Patent No.: US 10,624,459 B1
(45) Date of Patent: Apr. 21, 2020

(54) COMBINATION PORTABLE CHAIR AND EQUIPMENT CADDY

(71) Applicant: John C. Lykouretzos, Twin Lakes, WI (US)

(72) Inventor: John C. Lykouretzos, Twin Lakes, WI (US)

( * ) Notice: Subject to any disclaimer, the term of this patent is extended or adjusted under 35 U.S.C. 154(b) by 0 days.

(21) Appl. No.: 16/207,949

(22) Filed: Dec. 3, 2018

(51) Int. Cl.
*A01K 97/22* (2006.01)
*A47C 7/62* (2006.01)
*A45C 13/28* (2006.01)
*A47C 7/40* (2006.01)
*A45C 9/00* (2006.01)

(52) U.S. Cl.
CPC .............. *A47C 7/628* (2018.08); *A01K 97/22* (2013.01); *A45C 13/28* (2013.01); *A47C 7/407* (2013.01); *A45C 2009/002* (2013.01)

(58) Field of Classification Search
CPC ...................................................... A01K 97/22
See application file for complete search history.

(56) References Cited

U.S. PATENT DOCUMENTS

| | | | |
|---|---|---|---|
| 2,689,160 A * | 9/1954 | Culp | A01K 97/22 312/235.3 |
| 2,904,031 A | 9/1959 | Scott | |
| 3,114,574 A | 12/1963 | Pryale | |
| 3,344,552 A * | 10/1967 | Glasco | A01K 97/05 43/56 |
| 3,744,842 A | 7/1973 | Ronning | |
| 3,746,391 A * | 7/1973 | Novak | A47C 3/16 297/188.1 |
| 3,751,845 A * | 8/1973 | van Leeuwen | A01K 97/05 43/56 |
| 4,436,340 A | 3/1984 | Hernandez | |
| 4,460,188 A | 7/1984 | Maloof | |
| 4,760,802 A * | 8/1988 | Leong | A47B 13/023 108/157.16 |
| 5,100,198 A * | 3/1992 | Baltzell | A47C 7/74 280/30 |
| 5,170,516 A * | 12/1992 | Davison | A47K 11/00 297/188.09 |
| 5,303,500 A | 4/1994 | Luukonen | |
| 5,586,805 A | 12/1996 | Rinehart | |
| 5,692,335 A | 12/1997 | Magnuson | |
| 5,938,276 A | 8/1999 | Munoz et al. | |
| 5,970,651 A * | 10/1999 | Torkilsen | A01K 97/01 206/315.11 |
| 6,364,150 B1 | 4/2002 | Persinger | |

(Continued)

*Primary Examiner* — Timothy J Brindley
(74) *Attorney, Agent, or Firm* — Wozny Law, LLC; Thomas M. Wozny

(57) ABSTRACT

A lightweight, portable, and compact combination chair and equipment caddy. The combination chair and caddy is accomplished by using a standard five or six gallon bucket together with an integral seat and back rest. The back rest is movable between an extended position for supporting a user's back when seated on the bucket, and a retracted storage position. When the back rest is in its storage position, it is retracted almost completely within the interior of the bucket to enable easy carrying of the bucket via its handle. The back rest also uses the handle of the bucket to hold it in its extended position thereby keeping costs and materials to a minimum.

18 Claims, 5 Drawing Sheets

(56) References Cited

U.S. PATENT DOCUMENTS

| | | | |
|---|---|---|---|
| 6,938,761 B2* | 9/2005 | Nish | A45C 3/00 206/315.11 |
| 6,993,931 B1* | 2/2006 | Hamilton | A45B 23/00 62/371 |
| 7,055,907 B1 | 6/2006 | Tilby | |
| 7,341,314 B1* | 3/2008 | Boyd | A47C 9/10 297/188.09 |
| 7,467,590 B1* | 12/2008 | Meller | A47B 37/00 108/90 |
| 7,604,290 B1* | 10/2009 | Giordano | A47C 3/32 220/915.2 |
| 9,072,382 B2 | 7/2015 | Johansson | |
| 9,078,526 B1* | 7/2015 | Kammeyer | A47C 13/00 |
| 9,974,392 B1 | 5/2018 | Bruning et al. | |
| 2004/0075248 A1* | 4/2004 | Elden | B62B 1/12 280/651 |
| 2008/0006260 A1 | 1/2008 | Godbout | |
| 2014/0014669 A1* | 1/2014 | Smith | F25D 3/08 220/592.01 |
| 2015/0007603 A1* | 1/2015 | Keenan | F25D 3/08 62/419 |
| 2016/0000228 A1* | 1/2016 | Restrepo | A47C 7/62 297/188.1 |
| 2017/0245486 A1* | 8/2017 | Larson | A01K 97/10 |
| 2018/0038624 A1* | 2/2018 | Huish | F25D 3/08 |

* cited by examiner

COMBINATION PORTABLE CHAIR AND EQUIPMENT CADDY

BACKGROUND OF THE INVENTION

The present invention relates to an improved portable chair, and more specifically to a combination bucket and seat with integral back support.

Five and six gallon buckets are commonly used as portable chairs and caddies by fisherman, hunters, gardners, construction workers, and others to not only carry and transport various implements, tools, and accessories, but also to sit on when overturned. Such buckets have an open top and closed bottom, are typically about two feet tall and one foot in diameter, made of plastic or metal, and have a wire handle pivotally attached near their open top that spans across their open top for conveniently carrying the bucket. They are convenient for carrying items such as food, beverages, fishing tackle, especially ice fishing tackle, tip-ups and bait, as well as small gardening tools such as hand shovels, hand rakes, and dandelion diggers, and small construction tools such as trowels, levels, gloves, hammers, saws, pliers, and the like.

Fishermen, hunters, gardners, construction workers, and others oftentimes also use such buckets as a convenient seat or chair. Typically, the open top of such a bucket may be covered with a relatively flat item, such as a short piece of flat wood, to form the seat, or a bucket is overturned so its closed end bottom forms the seat.

Although many different seat and bucket combinations have been developed, most lack an integral arrangement for supporting a user's back. For anyone who spends time sitting on a bucket outdoors, a sore back due to lack of support can be a problem. After hours of sitting on a bucket with no back rest, an aching back can ruin what was supposed to be an enjoyable activity.

SUMMARY OF THE INVENTION

The present invention provides a lightweight, portable, and compact combination chair and equipment caddy. The combination chair and caddy is accomplished by using a standard five or six gallon bucket together with an integral seat and back rest. The back rest is movable between an extended position for supporting a user's back when seated on the bucket, and a retracted storage position. Preferably, when the back rest is in its storage position, it is retracted almost completely within the interior of the bucket to enable easy carrying of the bucket via its handle. The back rest also uses the handle of the bucket to hold it in its extended position thereby keeping costs and materials to a minimum.

In addition to supporting a user's back while enjoying outdoor activities, the use of a five or six gallon bucket provides a stable base for a seat. Also, the size of the bucket provides ample storage space for carrying various equipment and other items such as food and beverages therein.

The present invention thus provides not only an equipment caddy, but also a chair having a seat with back support. This combination eliminates the cumbersome chore of separately carrying both equipment and a chair to a desired location by a user.

DETAILED DESCRIPTION OF THE INVENTION

Figure 1:
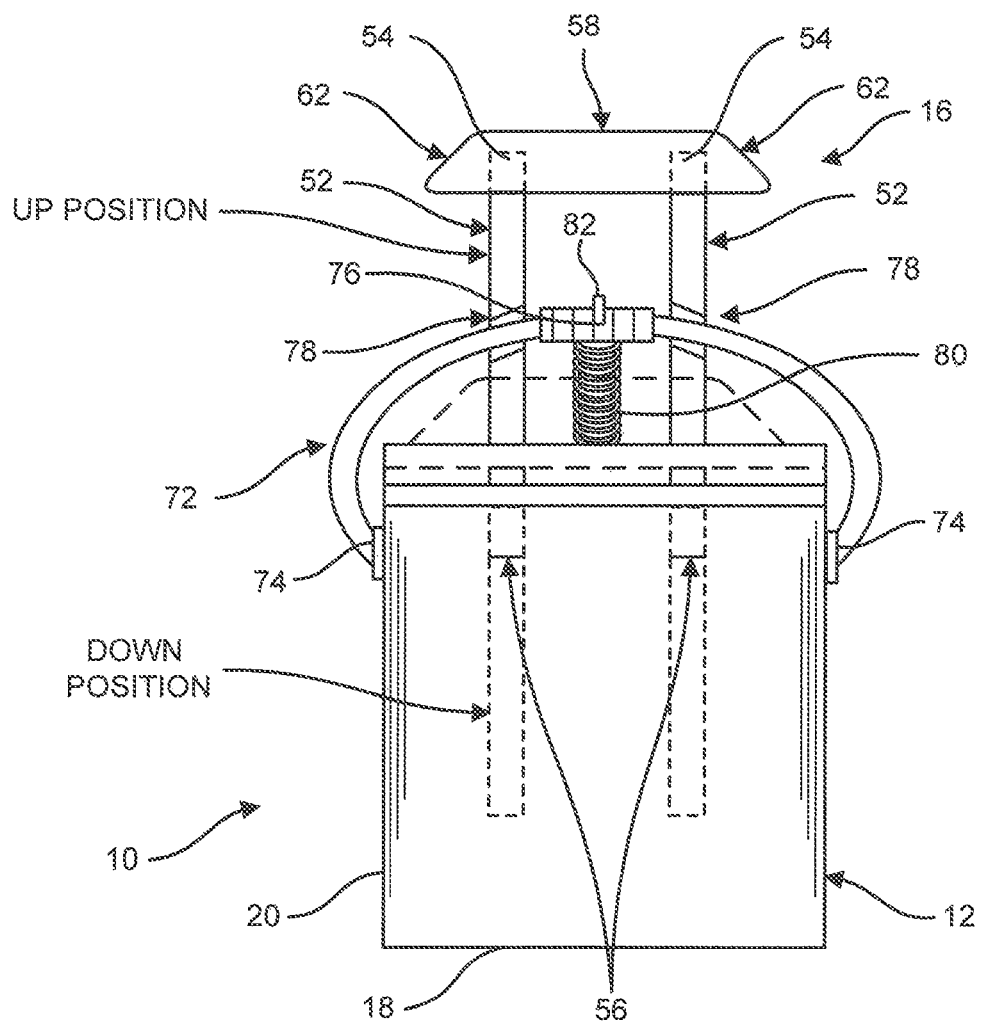
FIG. 1 is a front elevational view of a combination portable chair and equipment caddy constructed in accordance with the present invention.

Referring now to FIGS. 1-5, a combination portable chair and equipment caddy is illustrated, generally designated by the numeral 10. The combination portable chair and equipment caddy 10 includes a rigid base or bucket 12, together with an integral seat 14 and back rest 16.

Figure 2:
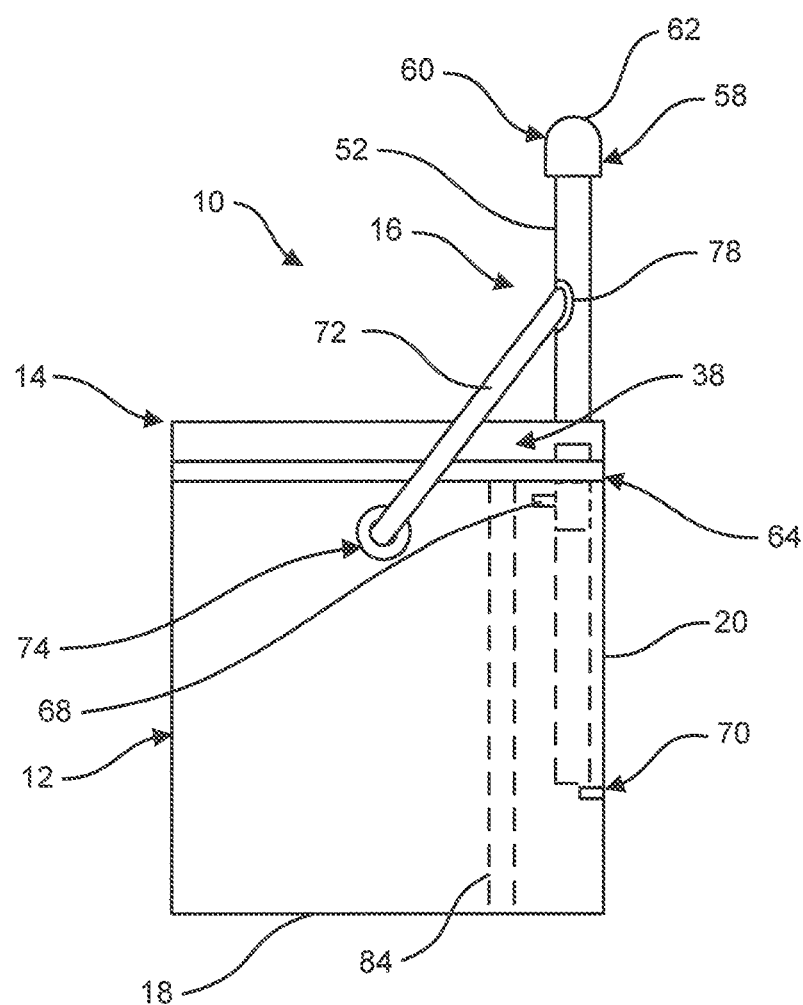
FIG. 2 is a side elevational view thereof.

The rigid base 12 has a closed bottom which includes a flat bottom wall 18 and a cylindrically-shaped side wall 20 attached to a periphery of bottom wall 18 and extending upwardly therefrom to define an interior cylindrical chamber 22 and a circular rim 24 forming an open top. Thus, as illustrated in FIGS. 1 and 2, rigid base 12 is in the form of a conventional five or six gallon plastic or metal bucket commonly available at hardware or home improvement stores. However, the circular shape of base 12 is not critical, and thus base 12 may also have an upstanding side wall 20 that has a square, a rectangular, a hexagonal, an octagonal, or other polygonal cross sectional shape so long as base 12 has sufficient strength and is capable of supporting a person or user siting thereon.

Figure 3:
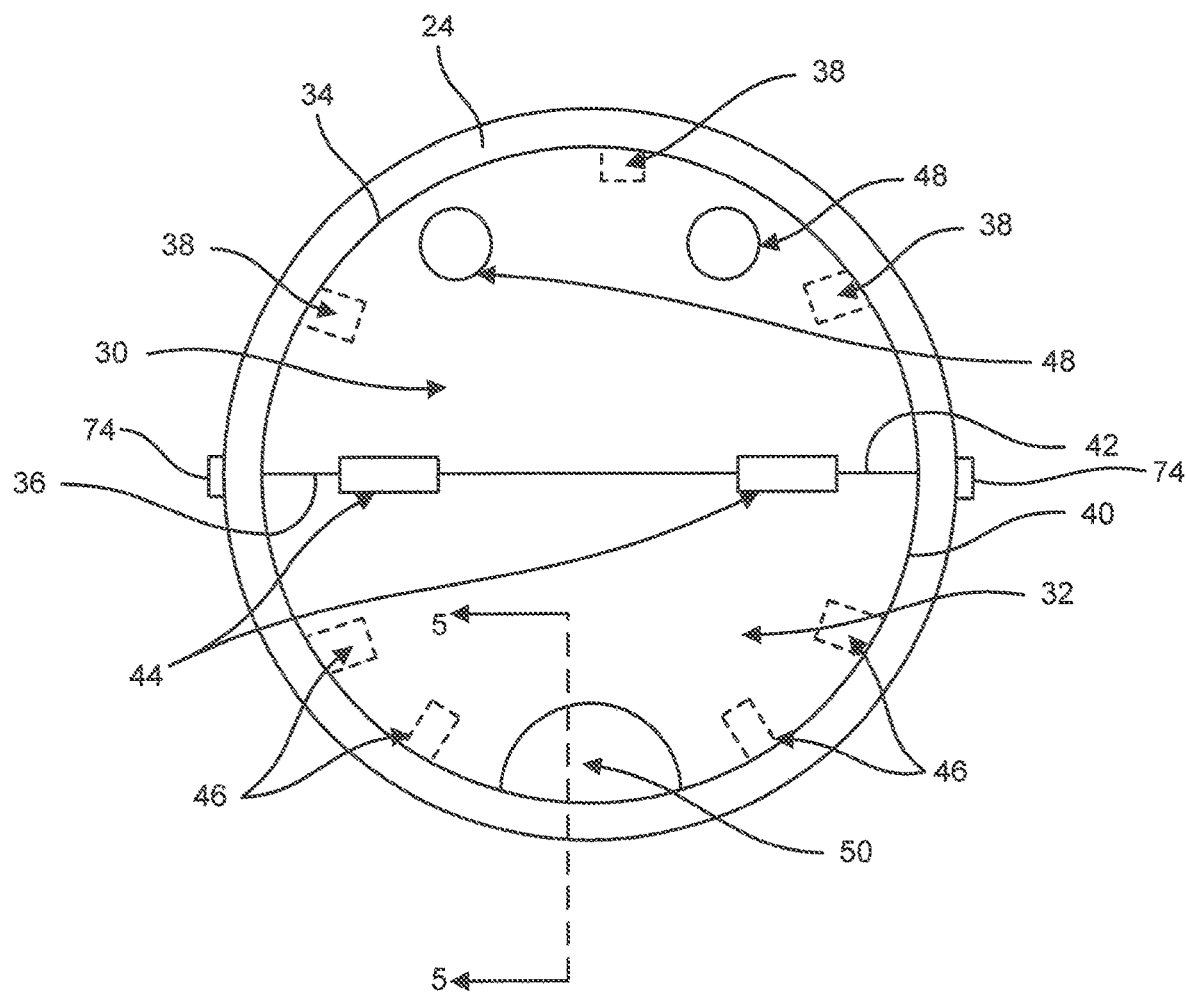
FIG. 3 is a top plan view thereof with the seat back rest and bucket handle removed for clarity.

The seat 14 is removable, and comprises a circular sheet or plate having a diameter approximately equal to the inside diameter of upstanding side wall 20. Seat 14 typically comprises a three-quarter inch plywood sheet having an upper surface 26 disposed flush with the upper end of rim 24 and a lower surface 28 disposed within, and thus recessed about three-quarter inch within, chamber 22, as shown best in FIG. 5. As illustrated in FIG. 3, however, seat 14 includes a semi-circular fixed portion 30 and a semi-circular fold-up portion 32 for allowing access to interior chamber 22. As also shown best in FIG. 3, fixed portion 30 has a semi-circular outer peripheral surface 34 having a radius that substantially matches the inner radius of side wall 20, and an inner surface 36 having a length that substantially matches the inner diameter of side wall 20. Fixed portion 30 is supported by three circumferentially spaced standard clips 38 mounted on rim 24 at the upper end of side wall 20. Each clip 38 has a U-shaped portion which extends over and around rim 24 so that rim 24 is received therein, and an L-bracket portion extending downwardly from rim 24 and projecting radially inwardly to engage and thereby support the lower surface 28 of fixed portion 30 of seat 14 within chamber 22.

Figure 5:
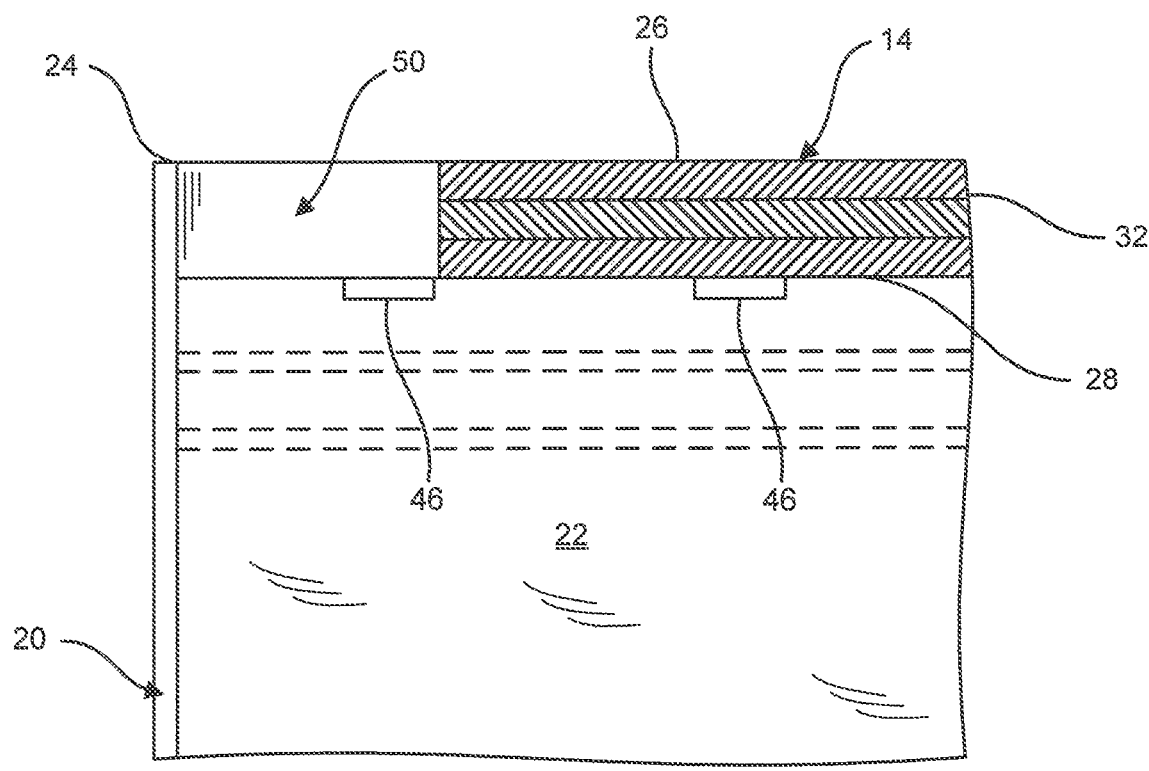
FIG. 5 is a partial sectional view taken along the line 5-5 in FIG. 3.

Fold-up portion 32 of seat 14 is substantially identical in shape to fixed portion 30. Fold-up portion 32 has a semi-circular outer peripheral surface 40 having a radius that substantially matches the inner radius of side wall 20, and an inner surface 42 having a length that substantially matches the inner diameter of side wall 20. Fold-up portion 32 is pivotally mounted on fixed portion 30 by a pair of hinges 44 disposed along and interconnecting inner surfaces 36 and 42 to move between open and closed positions. When closed, fold-up portion 32 of seat 14 is supported by four circumferentially spaced standard clips 46, which are structurally the same as and are mounted on rim 24 in the same manner as clips 38, as best shown in FIGS. 3 and 5, to position fold-up portion 32 flush with the upper edge of side wall 20.

As illustrated in FIG. 3, the fixed portion 30 of seat 14 has a pair of spaced round openings 48 formed therethrough near its outer surface 34 to accommodate back rest 16, as will hereinafter be described. As also shown in FIG. 3, the fold-up portion 32 of seat 14 includes a semi-circular hole 50 formed therethrough along its outer peripheral surface 40 between screws 46 to accommodate elongate equipment such as fishing rods. A partition wall 84 extends vertically between seat 14 and bottom wall 18, as shown best in FIGS. 2 and 4, and thus prevents articles stored in the chamber 22 from interfering with the sliding movement of legs 52.

In use, when the fold-up portion 32 of seat 14 is closed, a person may use the entire area of upper surface 26 for support while sitting on base 12. However, a person may access interior chamber 22 of base 12 by simply moving one's weight to be supported solely by fixed portion 30 of seat 14, and then grasping the edge of hole 50 and pivoting fold-up portion 32 upwardly to its open position.

Back rest 16 is slidably mounted on side wall 20 of base or bucket 12, and is movable with respect to side wall 20 in a vertical direction perpendicular to bottom wall 18, as shown best in FIG. 2. Back rest 16 is movable between an upward extended position, as shown in solid lines in FIGS. 1 and 2, for supporting a user's back when seated on base or bucket 12, and a downward retracted storage position, as shown in broken lines in FIGS. 1 and 2. In its storage position, most of back rest 16 is disposed within chamber 22 of base or bucket 12 for easy carrying of the portable chair and equipment caddy 10.

Back rest 16 is preferably made of wood to minimize weight, and is a generally U-shaped member having a pair of laterally spaced parallel legs 52. Each leg 52 has an upper end 54 and a lower end 56. Legs 52 are connected at their upper ends 54 by an integral transverse back support element 58. Element 58 has a flat front surface 60 engageable with a person's back, and a pair of angled cut-outs 62 at its opposite sides which provide clearance for handle 72 to move or pivot past back support element 58 when back rest 16 is in its downward storage position.

Figure 4:
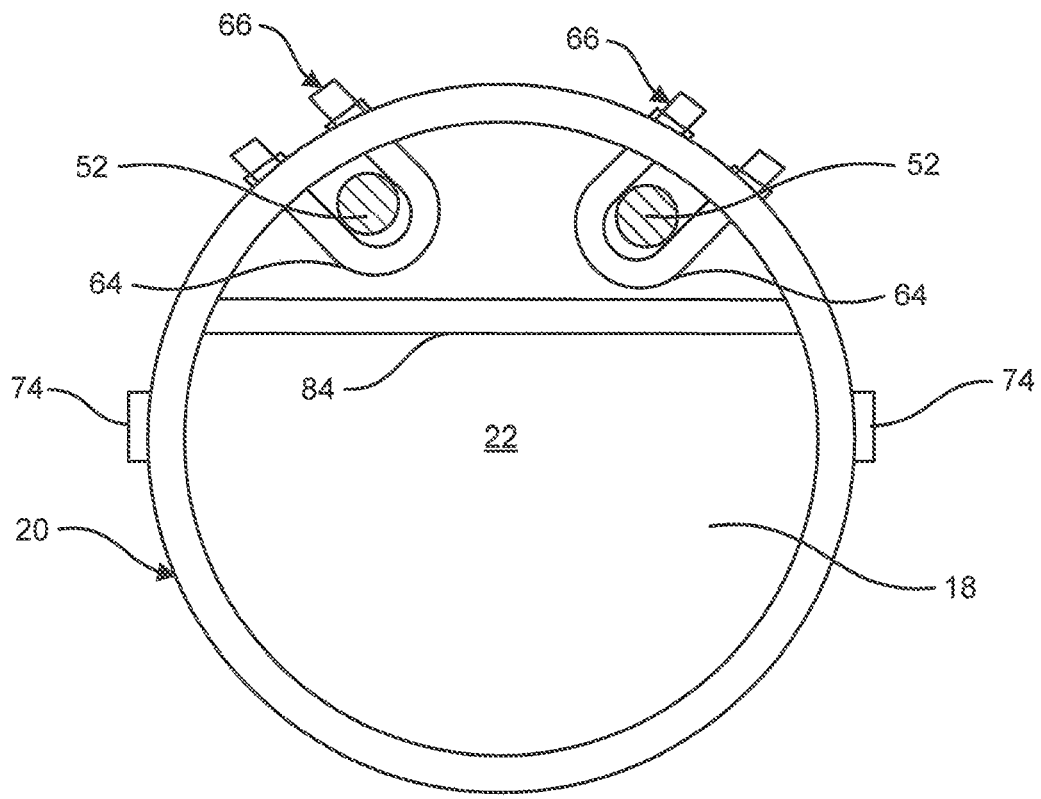
FIG. 4 is a sectional view taken along the line 4-4 in FIG. 2.

Legs 52 extend through openings 48 in fixed portion 30 of seat 14 into chamber 22, and are slidably mounted on the interior of side wall 20 by extending through a pair of U-bolts 64, as shown best in FIG. 4, so that back rest 16 may move in a vertical direction perpendicular to bottom wall 18 of base 12. U-bolts 64 are disposed near the top of side wall 20 below rim 24, and are positioned such that the head of each U-bolt 64 is disposed within chamber 22, and slidable receives its respective leg 52 of back rest 16, and the legs of each U-bolt 64 extend through side wall 20 and project from the exterior surface of side wall 20. U-bolts 64 are secured in place by nuts 66 turned onto the threaded ends of their legs, as is conventional.

An upper stop 68 is provided to limit the upward sliding movement of back rest 16 to thereby determine its maximum up extended position. Upper stop 68 comprises an abutment member, such as a screw, projecting outwardly from the lower end of one or both legs 52 of back rest 16. Thus, when back rest 16 is raised or extended upwardly, legs 52 move vertically through openings 48 in fixed portion 30 of seat 14 until upper stop 68 engages the underside 28 of fixed portion 30 to thereby stop further upward movement of back rest 16 so that back rest 16 is in its up extended position, as shown in solid lines in FIGS. 1 and 2.

A lower stop 70 is provided to limit the downward sliding movement of back rest 16 to thereby determine its down retracted storage position. Lower stop 70 comprises an abutment element, such as a screw, at the lower end of side wall 20 which projects inwardly into chamber 22 to interfere with one or both legs 52 of back rest 16. Thus, when back rest 16 is lowered downwardly, legs 52 move vertically downwardly through openings 48 in fixed portion 30 of seat 14 until one or both engage stop 70 to thereby prevent further downward movement of back rest 16 so that back rest 16 is in its down storage position, as shown in broken lines in FIG. 1.

Base or bucket 12 also includes a conventional handle 72 mounted thereto for carrying the combination portable chair and equipment caddy 10. Handle 72 is typically made of a C-shaped metal wire with its terminal ends pivotally mounted, as at 74, to opposite sides of side wall 20 and below rim 24 to permit side-to-side pivotal movement for handle 72. In particular, handle 72 is pivotally movable between an upright carrying position, which is typically substantially perpendicular to seat 14, and an angled back rest retaining position. The angled back rest retaining position for handle 72 is shown in FIGS. 1 and 2. As illustrated, when the handle 72 is in its back rest retaining position, it engages the legs 52 of back rest 16 when back rest 16 is in its up extended position to hold back rest 16 in its up extended position and thereby prevent sliding movement of back rest 16. Handle 72 also has a hand grip 76 thereon for providing easier carrying of chair and caddy 10.

A releasable back rest retaining arrangement is provided for holding back rest 16 in its up extended position and to prevent it from sliding downwardly once extended. The releasable back rest retaining arrangement is provided by the handle 72 engaging within a pair of handle-receiving notches 78, wherein one notch 78 is formed in each leg 52 of back rest 16. Notches 78 are disposed approximately half-way along the length of each leg 52 and are formed in the forward facing surface 60 of each leg 52, i.e. the left facing surface 60 shown in FIG. 2. Each notch 78 is dimensioned so as to have an arcuate surface substantially matching the arcuate surface of handle 72 to minimize possible accidental dislodgement of handle 72 from notches 78 during use. A spring 80 extending between handle 72 and side wall 20 having a hook 82 extending around hand grip 76 may be used to apply a force to handle 72 to retain handle 72 in notches 78 to further aid in preventing accidental dislodgement of handle 72 from notches 78, In use, back rest 16 is pulled upwardly from within base or bucket 12 until upper stop 68 engages the underside 28 of the fixed portion 30 of seat 14. Handle 72 is then pivoted or moved to the right, as shown in FIG. 2, until received within notches 78 in legs 52. Spring 80 is then stretched until its upper end clips over handle 72 thus retaining handle in notches 78 and back rest 16 in its up extended position, as shown in solid lines in FIGS. 1 and 2.

When finished using the combination chair and caddy 10, a person simply disengages spring 80 from handle 72, pivots handle 72 to the left and away from back rest 16, and then pushes back rest 16 downwardly into chamber 22 until the lower ends 56 of legs 52 engage lower stop 70 whereupon transverse back support element 58 will be engaging the upper surface 26 of seat 14, and back rest 16 will be in its down storage position, as shown in broken lines in FIG. 1.

I claim:

1. A combination portable chair and equipment caddy, comprising:
   a rigid base having a flat bottom wall and a side wall attached to a periphery of said bottom wall extending upwardly therefrom to define an interior chamber and a rim forming an open top;
   a removable seat mounted on said base at said open top;

a back rest slidably mounted on said base and movable with respect to the side wall of said base between an up extended position for supporting a user's back when seated on said base, and a down retracted storage position; and an upper stop to provide a limit of sliding movement for the back rest to thereby determine said up extended position, and wherein said upper stop is on said back rest and is engageable with said seat.

2. The combination portable chair and equipment caddy of claim 1, wherein said side wall is cylindrically shaped.

3. The combination portable chair and equipment caddy of claim 1, wherein said seat has a fixed portion and a fold-up portion for allowing access to said interior chamber.

4. The combination portable chair and equipment caddy of claim 1, wherein said back rest slidably moves in a vertical direction perpendicular to said bottom wall.

5. The combination portable chair and equipment caddy of claim 4, wherein said back rest is slidably mounted on said side wall.

6. The combination portable chair and equipment caddy of claim 1, further comprising a releasable back rest retaining arrangement for holding said back rest in said up extended position.

7. The combination portable chair and equipment caddy of claim 6, wherein said releasable back rest retaining arrangement comprises a handle mounted on said base, said handle movable between a carrying position and a back rest retaining position engageable with said back rest when said back rest is in its up extended position to prevent sliding movement of said back rest.

8. The combination portable chair and equipment caddy of claim 7, wherein said releasable retaining arrangement further comprises a spring member extending between said handle and the side wall of said base.

9. A combination portable chair and equipment caddy, comprising:
a rigid bucket having a flat bottom wall and a cylindrically-shaped side wall attached to a periphery of said bottom wall extending upwardly therefrom to define an interior chamber and a circular rim forming an open top;
a removable seat mounted on said bucket at said open top;
a back rest slidably mounted on the side wall of said bucket and movable with respect to the side wall of said bucket in a vertical direction perpendicular to the bottom wall of said bucket between an up extended position for supporting a user's back when seated on said bucket, and a down retracted storage position; and
a releasable back rest retaining arrangement for holding said back rest in said up extended position, said releasable back rest retaining arrangement comprises a handle mounted on said base, said handle movable between a carrying position and a back rest retaining position engageable with said back rest when said back rest is in its up extended position to prevent sliding movement of said back rest.

10. The combination portable chair and equipment caddy of claim 9, wherein said back rest comprises a generally U-shaped member having laterally spaced parallel legs, each leg having an upper end and a lower end, said legs connected at their upper ends by an integral transverse back support element.

11. The combination portable chair and equipment caddy of claim 10, wherein said seat includes a pair of spaced openings formed therein, and said legs of said back rest extend therethrough into the interior chamber of said bucket.

12. The combination portable chair and equipment caddy of claim 11, further including an upper stop to provide a limit of sliding movement for the back rest to thereby determine said up extended position, said upper stop comprising an abutment member projecting from the lower end of one of said legs and engageable with said seat when said back rest is moved to said up extended position.

13. The combination portable chair and equipment caddy of claim 10, wherein each of said legs include a handle-receiving notch formed therein, and each notch engageable with said handle to retain said back rest in said up extended position.

14. The combination portable chair and equipment caddy of claim 13, further comprising a spring member extending between said handle and the side wall of said base applying a force to said handle to retain said handle in said notches.

15. The combination portable chair and equipment caddy of claim 9, wherein said seat has a fixed portion and a fold-up portion for allowing access to said interior chamber.

16. A combination portable chair and equipment caddy, comprising:
a rigid base having a flat bottom wall and a side wall attached to a periphery of said bottom wall extending upwardly therefrom to define an interior chamber and a rim forming an open top;
a removable seat mounted on said base at said open top;
a back rest slidably mounted on said base and movable with respect to the side wall of said base between an up extended position for supporting a user's back when seated on said base, and a down retracted storage position; and
a releasable back rest retaining arrangement for holding said back rest in said up extended position, said releasable back rest retaining arrangement comprises a handle mounted on said base, said handle movable between a carrying position and a back rest retaining position engageable with said back rest when said back rest is in its up extended position to prevent sliding movement of said back rest.

17. The combination portable chair and equipment caddy of claim 16, wherein said releasable retaining arrangement further comprises a spring member extending between said handle and the side wall of said base.

18. The combination portable chair and equipment caddy of claim 16, further including an upper stop on said back rest and engageable with said seat to provide a limit of sliding movement for the back rest to thereby determine said up extended position.

* * * * *